(12) United States Patent
Whatmough

(10) Patent No.: US 10,970,201 B2
(45) Date of Patent: Apr. 6, 2021

(54) SYSTEM, METHOD AND APPARATUS FOR DATA MANIPULATION

(71) Applicant: Arm Limited, Cambridge (GB)

(72) Inventor: Paul Nicholas Whatmough, Cambridge, MA (US)

(73) Assignee: Arm Limited, Cambridge (GB)

( * ) Notice: Subject to any disclaimer, the term of this patent is extended or adjusted under 35 U.S.C. 154(b) by 129 days.

(21) Appl. No.: 16/168,902

(22) Filed: Oct. 24, 2018

(65) Prior Publication Data

US 2020/0133831 A1 Apr. 30, 2020

(51) Int. Cl.
*G06F 12/02* (2006.01)
*G06T 3/60* (2006.01)

(52) U.S. Cl.
CPC .......... *G06F 12/0207* (2013.01); *G06T 3/602* (2013.01); *G06T 3/606* (2013.01)

(58) Field of Classification Search
CPC ... G06F 7/76; G06F 7/78; G06F 7/785; G06F 9/30032; G06F 9/3043; G06F 17/16; G06F 2212/454; G06F 2212/455; G06N 3/04; G06N 3/06; G06N 3/063; G06T 3/0031; G06T 3/0037; G06T 3/60–606; G11C 7/10; G11C 7/1012; G11C 7/1036; G11C 7/1039
USPC ........................................................ 708/514
See application file for complete search history.

(56) References Cited

U.S. PATENT DOCUMENTS

| | | | | |
|---|---|---|---|---|
| 9,201,899 | B2 * | 12/2015 | Nishimura | G06F 9/30032 |
| 10,460,416 | B1 * | 10/2019 | Sirasao | H03K 19/1776 |
| 10,515,135 | B1 * | 12/2019 | Zejda | G06F 17/12 |
| 10,572,225 | B1 * | 2/2020 | Ghasemi | G06F 7/5443 |
| 2018/0046906 | A1 | 2/2018 | Dally et al. | |
| 2019/0050717 | A1 | 2/2019 | Temam et al. | |

FOREIGN PATENT DOCUMENTS

WO 9614616 A1 5/1996

OTHER PUBLICATIONS

Wolfram Mathworld, https://mathworld.wolfram.com/Transpose.html, accessed 2017 (Year: 2017).*
J. Hennessy et al., Computer architecture: a quantitative approach, Elsevier, p. 678-691, 2014 (Year: 2014).*
D. Patterson et al., Computer Organization and Design, Elsevier, p. 318-319, fig 5.25, 2007 (Year: 2007).*
M. Cho, et al., MEC: Memory-efficient Convolution for Deep Neural Network, PMLR 70, 2017 (Year: 2017).*
A. Anderson et al., Low-memory GEMM-based convolution algorithms for deep neural networks, arXiv:1709.03395v1 [cs.CV], 2017 (Year: 2017).*
Pete Warden, "Why GEMM is at the Heart of Deep Learning," https://petewarden.com/2015/04/20/why-gemm-is-at-the-heart-of-deep-learning/ , Apr. 20, 2015.

(Continued)

*Primary Examiner* — Andrew Caldwell
*Assistant Examiner* — Emily E Larocque
(74) *Attorney, Agent, or Firm* — Leveque IP Law, P.C.

(57) ABSTRACT

A system, apparatus and method for utilizing a transpose function to generate a two-dimensional array from three-dimensional input data. The use of the transpose function reduces redundant elements in the resultant two-dimensional array thereby increasing efficiency and decreasing power consumption.

26 Claims, 10 Drawing Sheets

(56) References Cited

OTHER PUBLICATIONS

Y. H. Chen, J. Emer and V. Sze, "Eyeriss: A Spatial Architecture for Energy-Efficient Dataflow for Convolutional Neural Networks," 2016 ACM/IEEE 43rd Annual International Symposium on Computer Architecture (ISCA), Seoul, 2016, pp. 367-379.

Jouppi et al., "In-Datacenter Performance Analysis of a Tensor Processing Unit," 44th International Symposium on Computer Architecture (ISCA), Toronto, Canada, Jun. 24-28, 2017.

B. Moons and M. Verhelst, "A 03—2.6 TOPS/W precision-scalable processor for real-time large-scale ConvNets," 2016 IEEE Symposium on VLSI Circuits (VLSI—Circuits), Honolulu, HI, 2016, pp. 1-2.

Parashar et al., "SCNN: An Accelerator for Compressed-sparse Convolutional Neural Networks," ISCA '17 Proceedings of the 44th Annual International Symposium on Computer Architecture, Toronto, ON, Canada—Jun. 24-28, 2017, pp. 27-40.

Yosinski et al., "How transferable are features in deep neural networks?," Advances in Neural Information Processing Systems 27, pp. 3320-3328. Dec. 2014.

Dongyoung Kim, Junwhan Ahn, and Sungjoo Yoo. 2017. A novel zero weight/activation-aware hardware architecture of convolutional neural network. In Proceedings of the Conference on Design, Automation & Test in Europe (Date 17). European Design and Automation Association, 3001 Leuven, Belgium, Belgium, 1466-1471.

Jason Yosinski, Jeff Clune, Yoshua Bengio, Hod Lipson, "How transferable are features in deep neural networks?," Proceedings of the 27th International Conference on Neural Information Processing Systems—vol. 2, Montreal, Canada, p. 3320-3328, 2014, MIT Press.

Sarwar, Syed & Ankit, Aayush & Roy, Kaushik. (2017). Incremental Learning in Deep Convolutional Neural Networks Using Partial Network Sharing.

\* cited by examiner

SYSTEM, METHOD AND APPARATUS FOR DATA MANIPULATION

BACKGROUND

Machine learning technology is continually evolving and has come to support many aspects of modern society. One of the most useful applications of machine learning is image classification. Image classification can be achieved by using a neural network to efficiently manipulate a large quantity of data. Other uses of machine learning include web searches, content filtering, automated recommendations on merchant websites, automated game playing, object detection, speech recognition, machine translations, and drug discoveries.

BRIEF DESCRIPTION OF THE DRAWINGS

The accompanying drawings provide visual representations, which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1:
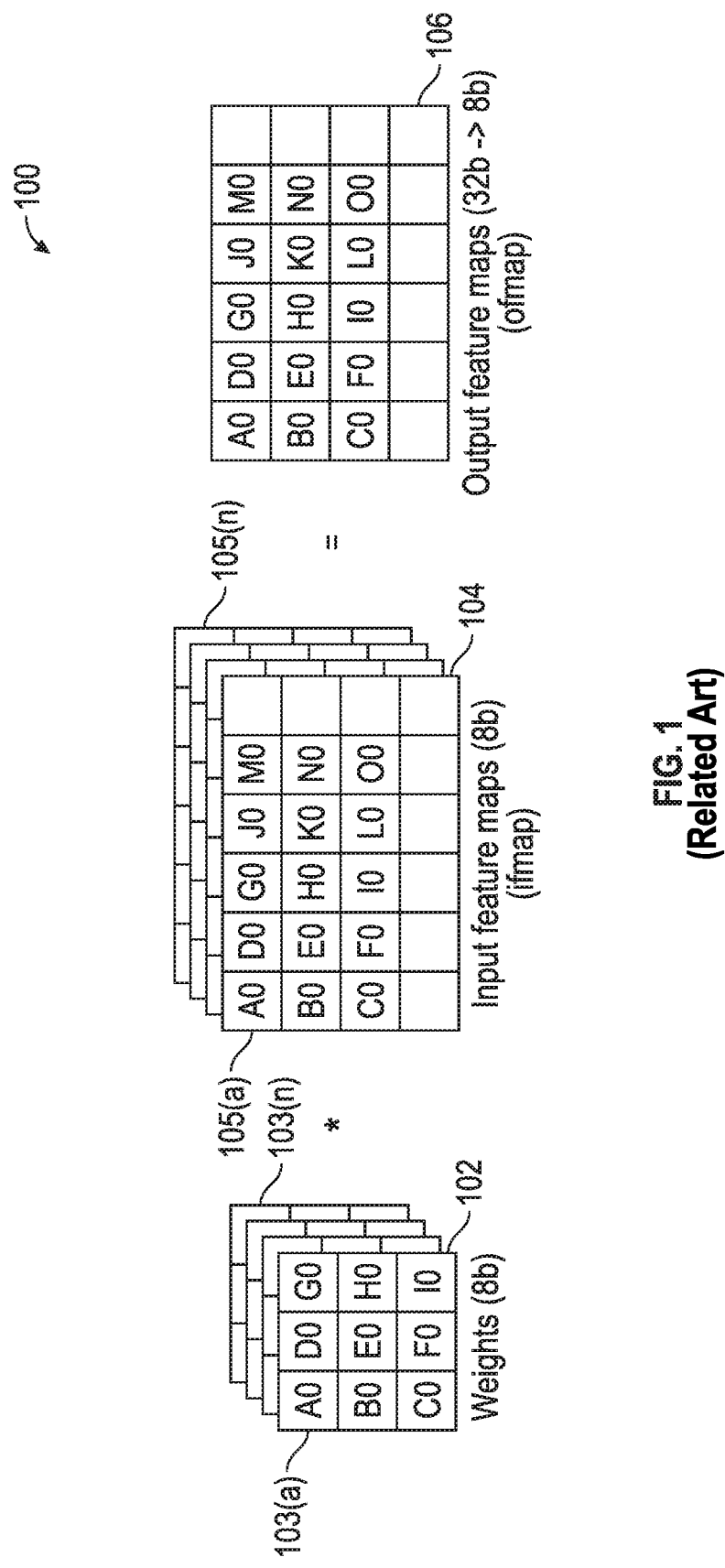
FIG. 1 illustrates calculation of a single output feature map of a convolutional neural network (CNN) layer.

While this disclosure is susceptible of embodiment in many different forms, there is shown in the drawings and will herein be described in detail specific embodiments, with the understanding that the present disclosure is to be considered as an example of the principles described and not intended to limit the disclosure to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprise", "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

A "module" as used herein describes a component or part of a program or device that can contain hardware or software, or a combination of hardware and software. In a module that includes software, the software may contain one or more routines, or subroutines. One or more modules can make up a program and/or device.

Neural networks (NNs) are typically used to map or classify a set of input patterns to a set of output patterns. Systems based on neural networks have evolved as a popular machine learning basis, and have been successfully employed in a wide variety of domains for practical applications.

In order to classify the input patterns with adequate correctness, the neural networks first need to do undergo a learning exercise, which is called the training phase. During the training phase, paired training samples, for example depicted as (x, y), of an input x and a corresponding output or label y, are provided to the neural network, which then learns or establishes how to associate or map the given input x with the correct output y.

Neural networks and related systems can be represented as distributed processing elements that implement summation, multiplication, exponentiation or other functions on the elements incoming messages/signals. Such networks can be enabled and implemented through a variety of implementations.

For example, a system may be implemented as a network of electronically coupled functional node components. The functional node components can be logical gates arranged or configured in a processor to perform a specified function. As a second example, the system may be implemented as a network model programmed or configured to be operative on a processor.

The network model is preferably electronically stored software that encodes the operation and communication between nodes of the network. Neural networks and related systems may be used in a wide variety of applications and can use a wide variety of data types as input such as images, video, audio, natural language text, analytics data, widely distributed sensor data, or other suitable forms of data.

While neural networks have desired features, convolutional neural networks (CNNs) may be considered a less-than completely connected neural network (each neuron is connected to only a few neurons in the previous layer) and neurons share weights.

The convolutional neural network (CNN) is a subclass of neural-networks, which have at least one convolution layer. CNN are typically used for capturing local information (e.g., neighboring pixels in an image or surrounding words in a text) as well as reducing the complexity of the model (faster training, needs fewer samples, reduces the chance of overfitting).

Convolutional neural networks (CNN), are feed-forward neural networks that comprise layers that are not fully connected. In CNNs, neurons in a convolutional layer are connected to neurons in a subset, or neighborhood, of an earlier layer. This enables, in at least some CNNs, retaining spatial features in the input.

Thus, convolutional neural networks (CNNs) may comprise a set of layers, the first layer being an input layer configured to receive an input. The input layer includes neurons that are connected to neurons in a second layer, which may be referred to as a hidden layer. Neurons of the hidden layer may be connected to a further hidden layer, or an output layer.

CNNs have repetitive blocks of neurons that are applied across space (for images) or time (for audio signals etc). For images, these blocks of neurons can be interpreted as 2D convolutional kernels, repeatedly applied over each patch of the image. For speech, they can be seen as the 1D convolutional kernels applied across time-windows. At training time, the weights for these repeated blocks are "shared", i.e., the weight gradients learned over various image patches are averaged.

In particular, convolutional neural networks (CNNs) may be useful for performing inference on data for which feature recognition is independent of one or more dimensions of the data; for example, when detecting shapes in an image, the detected shapes are not dependent on their position in the image—the same features used to detect a square in one part of the image may be used to detect a square in another part of the image as well. These dimensions may be spatial (as in the 2D image example), but may additionally or alternatively be temporal or any suitable dimensions (e.g., a frequency dimension for audio or multispectral light data). In accordance with several embodiments, the processes may be performed by a "cloud" server system. In still further embodiments, the processes may be performed on a user device.

The embodiments described herein apply to any network layer, including CNN, FC or other layer in a network, either partially, or fully.

Convolutional neural networks (CNNs) are typically processed by converting the multi-dimensional convolution operations into generic matrix multiplication (GEMM), by means of a simple transform often referred to as image to column (IM2COL).

Convolutional neural networks (CNNs) are currently very popular for implementing tasks such as image classification. CNNs are challenging to implement in constrained devices, as they require a very large number of MAC operations, which operate on very large data structures.

The IM2COL transform, as described herein, is used to turn the input from an image, which is effectively a 3D array, into a 2D array that can be treated like a matrix. Each kernel of the 3D array image to which the transform is applied is a three-dimensional cube within the image, and so each one of those cubes of input values is copied out as a single column into a matrix.

As described herein, embodiments of the disclosure show a hardware implementation of IM2COL that results in a very large reduction in local SRAM (static random access memory) bandwidth by exploiting the redundancy/repetition in the IM2COL mapping.

The MAC (multiply-accumulate) operations are used in computing operations, especially DSP (digital signal processing). The MAC operation is a common operation that computes the product of two numbers and adds that product to an accumulator. The hardware unit that performs the operation is known as a multiplier-accumulator (MAC, or MAC unit); the operation itself is also often called a MAC or a MAC operation.

A fundamental CNN layer calculation is illustrated in FIG. 1 for a 3×3 filter size.

As shown in FIG. 1, system 100 includes weights 102, which include weights for each layer 103(a) . . . (n), where "n" is any suitable number. The weights 102 may be established for each layer generally, 103 or a combination of established, or fixed, and programmable.

Input feature map 104 has a plurality of layers 105(a) . . . (n), where "n" is any suitable number.

The output feature map 106 is generated by logically multiplying, or other suitable operation the weights 102 and the input feature map (IFM) 104, utilizing the various layers 103 and 105, respectively. While FIG. 1 illustrates an example of a 3×3 filter, any suitable structure could be used.

A common approach to implement convolution in a CPU (central processing unit), a GPU (graphics processing unit) and dedicated hardware accelerators is to convert it into a generic matrix multiplication (GEMM) operation.

The GEMM may be used for the convolutional layers since the convolutional layer treats its input as a two dimensional image, with a number of channels for each pixel, much like a classical image with width, height, and depth.

In software, the GEMM operation is performed by calling a library function. In hardware, the GEMM operation is often implemented efficiently as a 2D MAC array. For example, the Google® TPU and MIT Eyeriss® chips are two examples of dedicated hardware accelerators for CNNs.

Figure 2:
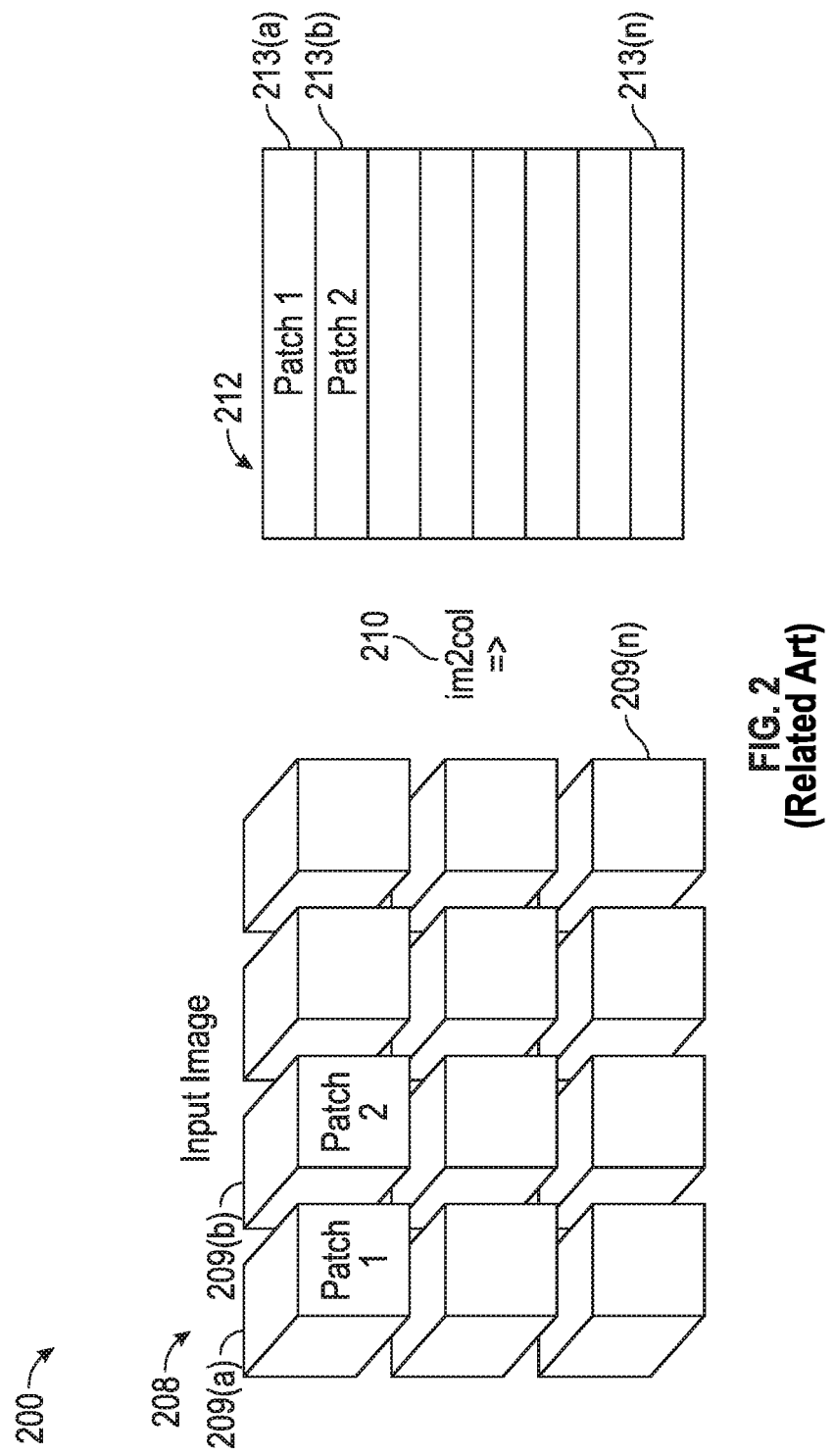
FIG. 2 illustrates an im2col function for a convolutional neural network (CNN).

As shown in FIG. 2, in order to convert convolution into GEMM, an IM2COL transform may be used. The IM2COL transform is used to "flatten" a 3D data structure into a 2D structure that can be processed efficiently with a GEMM like operation. This provides good locality in an essentially 1D memory system.

FIG. 2 shows a system 200 that includes an input image 208. Input image 208 has a three dimensional (3D) data structure shown by elements 209(a) . . . (n), where "n" is any suitable number of structure 208. An IM2COL transform 210 is used to transpose, or transform, or flatten, the 3D data structure 208 to a two-dimensional (2D) data structure 212. The 3D elements 209(a) . . . (n) of structure 208 are transposed into corresponding elements 213(a) . . . (n), respectively, where "n" is any suitable number, of 2D structure 212.

For software implementations, as shown in FIG. 2, the IM2COL operation 210 is usually done in memory, and results in increased memory occupancy. The memory cost of the IM2COL 210 is more than outweighed by the efficiency and memory locality that a software GEMM implementation can achieve.

Figure 3:
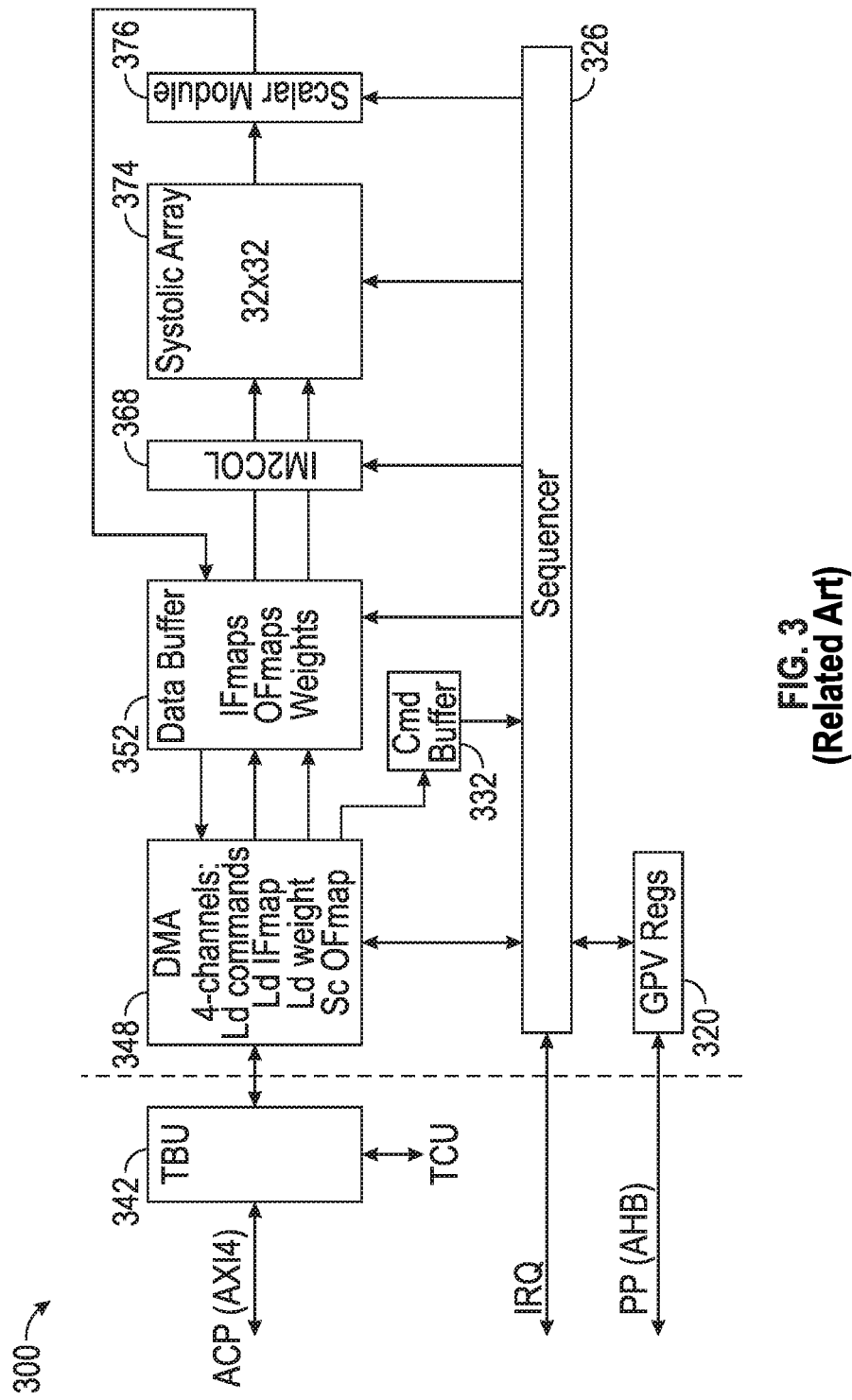
FIG. 3 illustrates a hardware accelerator used with a convolutional neural network (CNN).

FIG. 3 shows a hardware accelerator 300 used with a convolutional neural network (CNN). FIG. 3 shows that the accelerator 300 has GPV Register 320, sequencer module 326, command buffer 332, TBU 342, DMA 348, data buffer 352, IM2COL module 368, systolic array 374 and scalar module 376.

In hardware accelerators, the IM2COL 368 can be done inside the accelerator before the MAC array, and therefore does not usually result in increased memory occupancy. However, the redundancy in the flattened representation results in multiple reads of each word, which increases power consumption due to local SRAM read power. For context, FIG. 3 shows a typical hardware accelerator for CNNs, indicating the IM2COL transform 368 before the MAC array, which reads data from local SRAM inside the accelerator.

Figure 4:
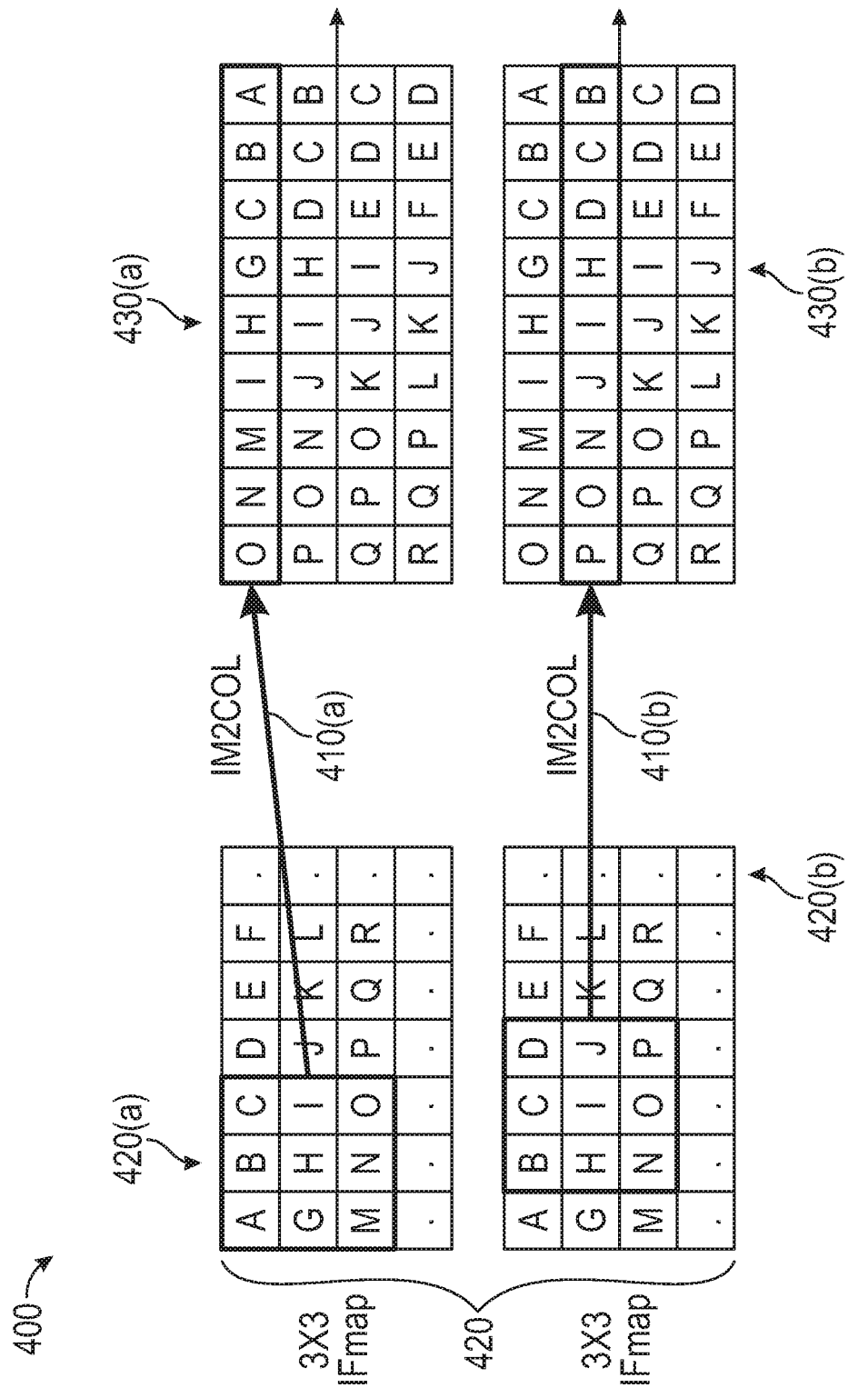
FIG. 4 illustrates an IM2COL operation for a 3×3 kernel.

FIG. 4 shows the IM2COL operation for a 3×3 kernel. Two iterations of patch 420 (420(a) and 420(b)) are shown. The 3×3 patch 420(a) and 420(b) generally, 420 is flattened into a row in the output matrix 430 (shown as two iterations 430(a) and 430(b)). On the second iteration 420(b), 430(b), the IM2COL is only actually reading 3 new elements (D,J,P), six of the nine elements were already read in the previous cycle (B,H,N,C,I,O) 420(a). This is clearly an inefficiency, and can be optimized to reduce the number of words read from SRAM and therefore lower power consumption.

Additional enhancements may be accomplished by using two optimized algorithms for implementing IM2COL, along with hardware implementations. The first is suitable for SIMD accelerators and "unpipelined" MAC arrays, which typically utilize "square-aligned" arrays. The second is targeted at systolic arrays, which typically utilize a skewed/diagonal pattern in the data movement.

Figure 5:
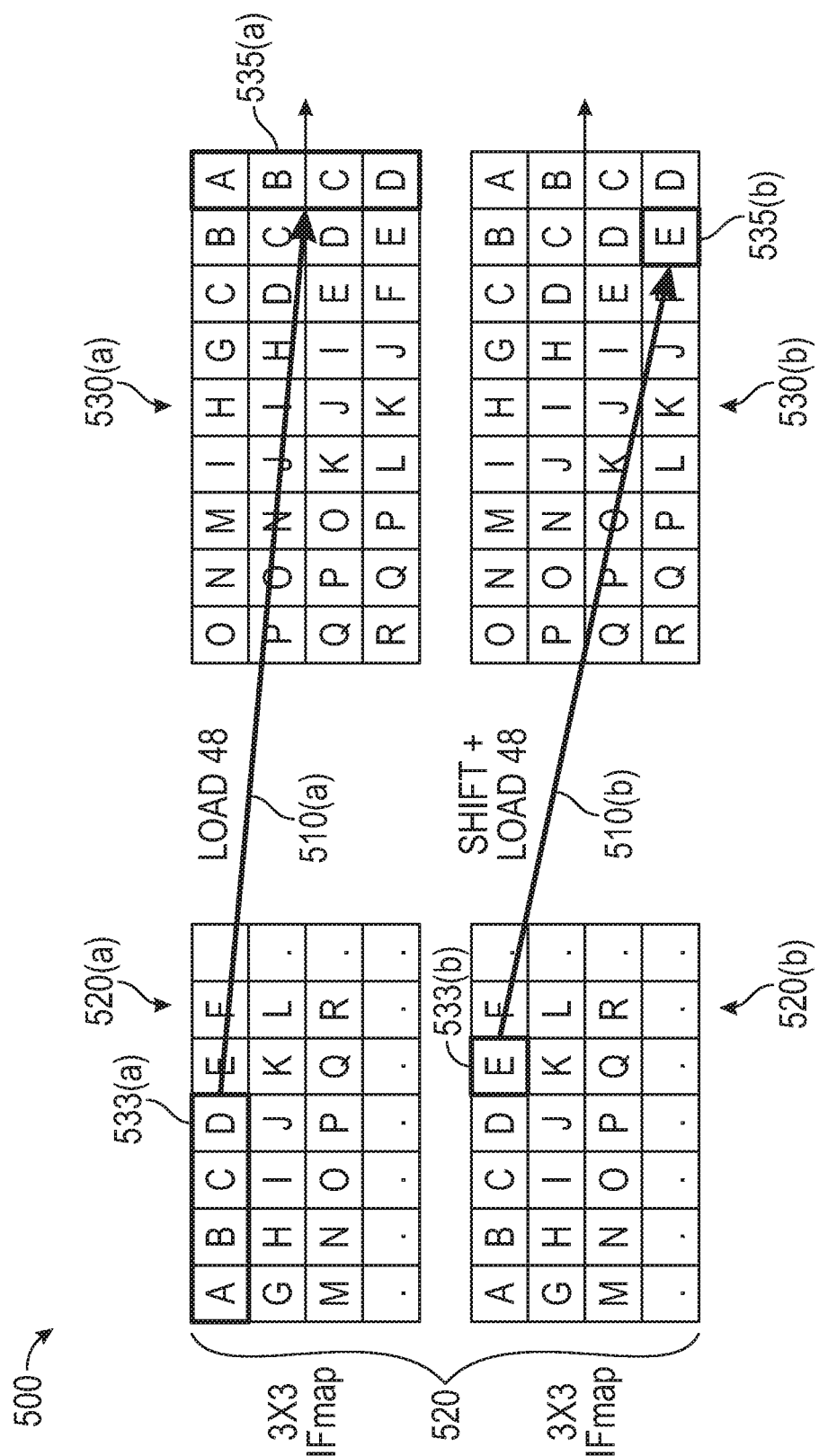
FIG. 5 illustrates a transpose to generate a single 4-element column per cycle.

FIG. 5 shows a representation 500 of transpose IM2COL 510 (510(a) and 510(b) iterations) to generate a single 4-element column per cycle. Average internal memory bandwidth is reduced by 2× (load 6 B instead of 12 B).

The approach in FIG. 5 is to switch from turning a patch 533(a) of 520(a) into a row 535(a) of 530(a), using IM2COL 510(a). Thus, the transpose 510(a) turns a small row 533(a) into a single column 535(a).

This transpose 510(a) generates a single output column 535(a) per cycle, rather than a whole row, which implies more buffering. For the initial operation this involves reading a 4-element row, which becomes a 4-element column in the output array. However, following this initial operation, subsequent cycles, which are shown as the (b) portion, only require a single 1 B load and a shift operation.

As shown in FIG. 5, element 533(b) of map 520(b) is transposed by IM2COL 510(b) to place the element, shown as 535(b) in map 530(b). As shown in FIG. 5, this is an aggregate internal bandwidth reduction of 2×.

Figure 6:
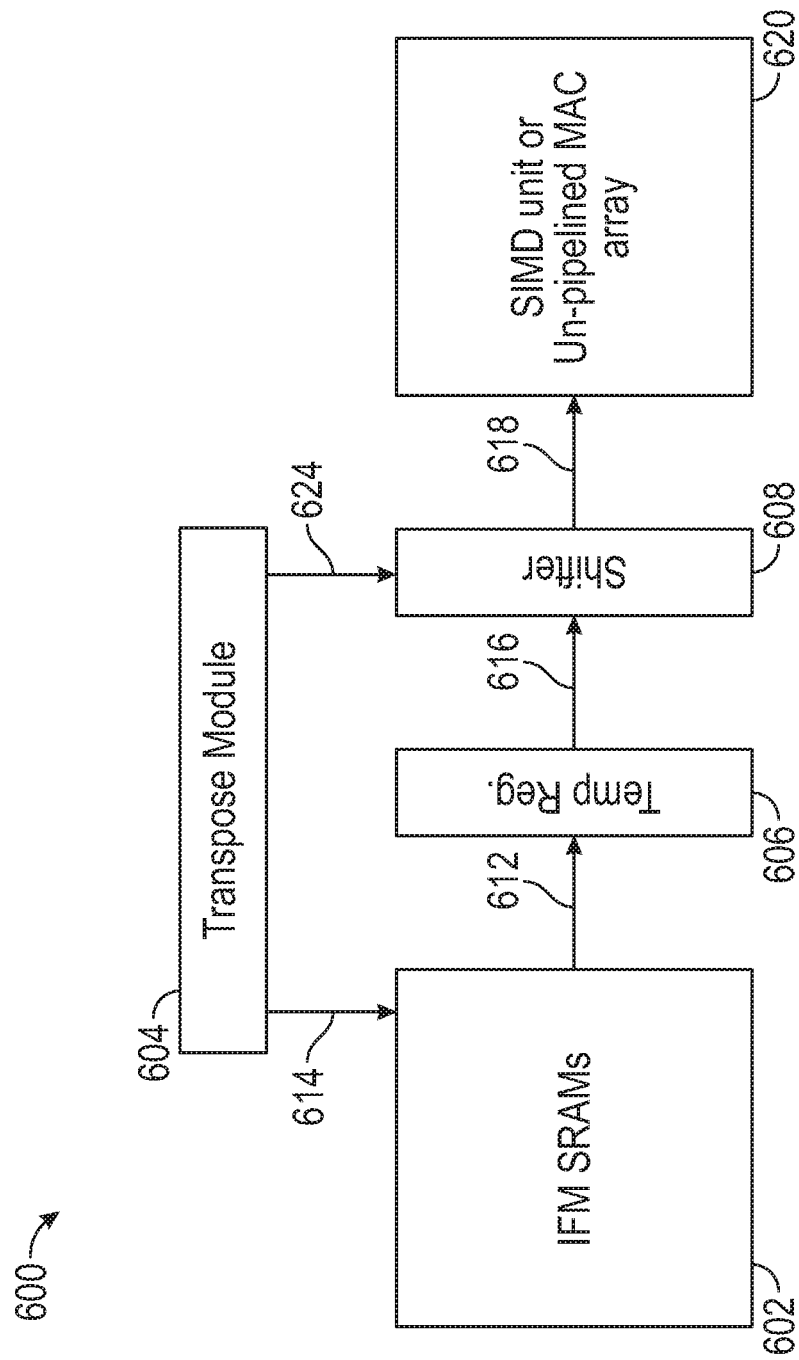
FIG. 6 illustrates a hardware arrangement to implement a transpose.

FIG. 6 illustrates a hardware arrangement 600 to implement a transpose, shown as an IM2COL transpose (FIG. 5). As shown in FIG. 6, arrangement 600 includes one or more IFM SRAMs, shown generally as 602, a transpose module 604, a temporary register 606, shift module 608, and module 620, which may be a SIMD unit or un-pipelined MAC array.

The IFM SRAMS 602 are memory registers used to store input feature map and layer information and map information that is provided to, or accessed by register 606, as shown by 612. IFM SRAMs 602 also receives input from the transpose module 604, as shown by 614.

The transpose module 604 may store a transpose function, such as an IM2COL, that is used to transpose a 3×3 input data. The transpose function is applied to the input data, using an algorithm, as described in FIGS. 9 and 10 herein. The transpose module 604 may also be considered a control and address generation module.

Register 606, which may be a temporary register, is used to store the input feature map (IFM) accessed from SRAM 602. The temporary register 606 may be a suitable buffer or storage medium to store the contents accessed from SRAM 602.

Shifter (shift register) 608 is operatively coupled to register 606, as shown by 616. Shift register 608 shifts data from register 606 to the left or to the right. The control and address generation module 604 provides input to shifter 608, as shown by 624.

Module 620 may be an SIMD module or, alternatively, an un-pipelined MAC array.

Module 620 may be a SIMD (single instruction multiple data) module that performs the same operation on multiple data points simultaneously, or substantially simultaneously.

Alternatively, module 620 may be an un-pipelined MAC array, which may be a module that includes a multiplier implemented in combinational logic followed by an adder and an accumulator register that stores the result.

In the MAC array, the output of the register is fed back to one input of the adder, so that on each clock cycle, the output of the multiplier is added to the register.

Figure 7:
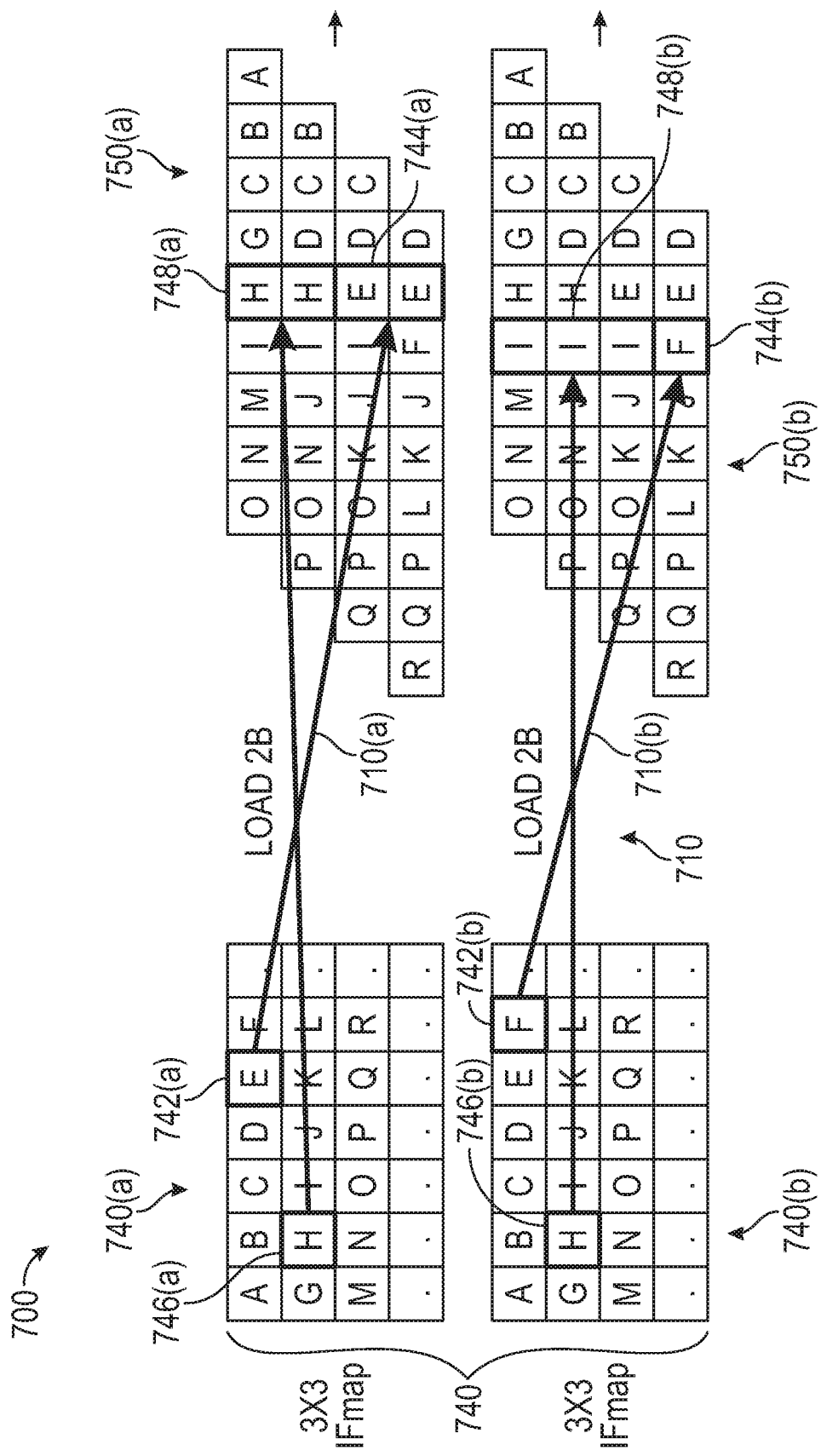
FIG. 7 illustrates an implementation of IM2COL transform for a staggered dataflow.

FIG. 7 shows an implementation 700 of IM2COL transform for a staggered dataflow. As shown in FIG. 7, the IM2COL transforms a staggered dataflow, as required by systolic arrays. This achieves a 2× internal bandwidth reduction, and does not use any more than 2 B/cycle.

Systolic arrays typically require a staggered data pattern. The staggering pattern is actually already inherent in IM2COL, which results in a pattern with many repeated elements next to each other, and is therefore efficiently implemented.

FIG. 7 shows a representation 700 of transpose IM2COL 710 (710(a) and 710(b) iterations) to generate a single 4-element column per cycle. Average internal memory bandwidth is reduced by 2× (load 6 B instead of 12 B).

The approach in FIG. 7 is to transpose, using IM2COL 710(a) and 710(b), 3×3 IFMAP 740 (740(a) and 740(b)) to map 750 (750(a) and 750(b)). Thus, patch "E" 742(a) of map 740(a) and "H" 746(a) of map 740(a) are transposed into "E", "E" 744(a) of map 750(a) and "H", "H" 748(a) of map 750(a), respectively.

As shown in FIG. 7, element "F" 742(b) of map 740(b) is transposed by IM2COL 710(b) to place the element "F", shown as element 742(b) to "F" shown as 744(b) in map 750(b). Element "I" 746(b) of map 740(b) is transposed by IM2COL 710(b) to the three elements "I", "I", "I", shown as 748(b) in map 750(b).

Figure 8:
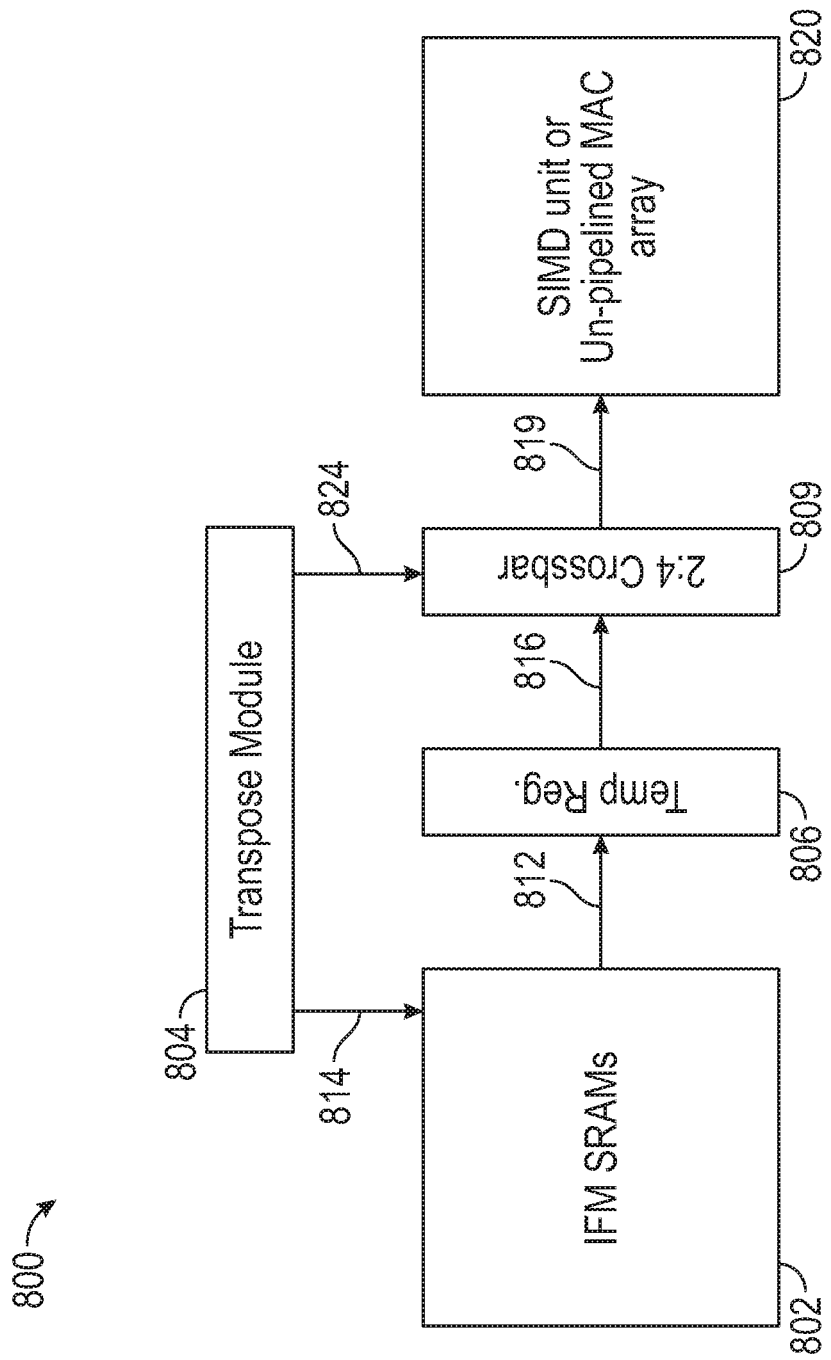
FIG. 8 illustrates a hardware arrangement to implement a transform.

FIG. 8 illustrates a hardware arrangement 800 to implement a transform. As shown in FIG. 8, a mux crossbar is substituted for the shift register shown in FIG. 6.

Specifically, FIG. 8, illustrates a hardware arrangement 800 to implement a transpose, shown as an IM2COL transpose (FIG. 7). As shown in FIG. 8, arrangement 800 includes one or more IFM SRAMs, shown generally as 802, a transpose module 804, a temporary register 806, crossbar 809, which could be a multiplex (mux) crossbar, and module 820, which may be a SIMD unit or un-pipelined MAC array.

The IFM SRAMS 802 are memory registers used to store input feature map and layer information and map information that is provided to, or accessed by register 806, as shown by 812. IFM SRAMs 802 also receives input from the transpose module, also considered a control and address generation module, 804, as shown by 814.

Transpose module 804 may store a transpose function, such as an IM2COL, that is used to transpose a 3×3 input data. The transpose function is applied to the input data, using an algorithm, as described in FIGS. 9 and 10 herein. The transpose module 804 may also be considered a control and address generation module.

Register 806, which may be a temporary register, is used to store the input feature map (IFM) accessed from SRAM 802. The temporary register 806 may be a suitable buffer or storage medium to store the contents accessed from SRAM 802.

Crossbar, or multiplexor, 809 is operatively coupled to register 806, as shown by 816. Crossbar 809 multiplexes data received from register 806. The control and address generation module 804 provides input to crossbar, or multiplexor, 809 as shown by 824.

Module 820 may be an SIMD module or, alternatively, an un-pipelined MAC array, as described herein in relation to FIG. 6.

The arrangement 800 shows modified hardware compared to FIG. 6 to support the staggered data pattern. This arrangement has the feature of only requiring at most two new operands per cycle.

Figure 9:
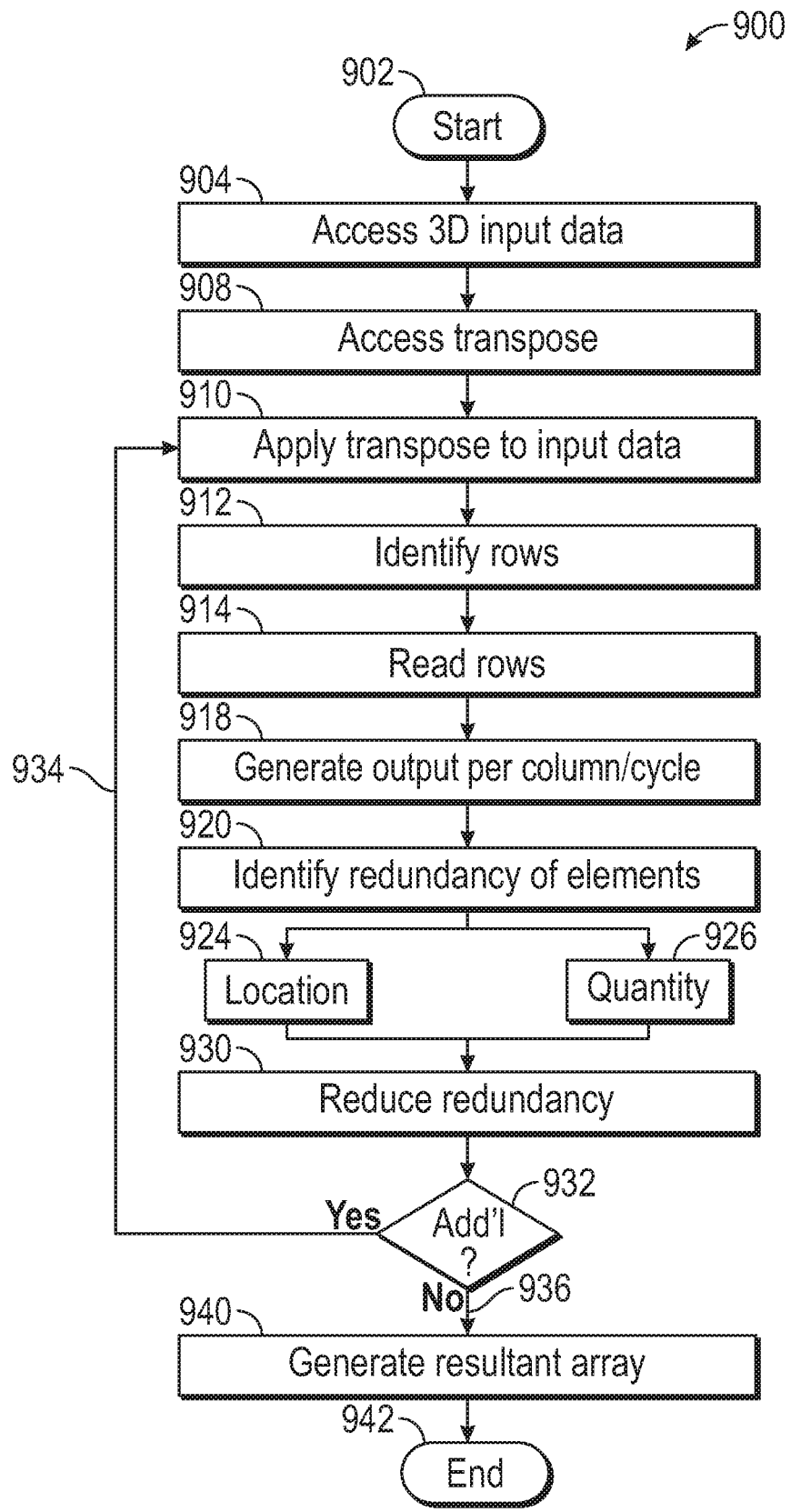
FIG. 9 illustrates a flowchart according to an embodiment.

FIG. 9 shows a flowchart 900 according to an embodiment. The algorithm 900 begins (902). A three-dimensional input data representation is accessed (904). This three-dimensional data representation may be image, audio, a combination of image and audio or any type of data that may be stored. The input may be an input feature map, as described herein.

A transpose function, such as an IM2COL function is accessed (908). This transpose function, for example the IM2COL function, is applied to the three-dimensional data (910) and is used to "flatten" the three-dimensional input data representation so that the three-dimensional input data representation can be represented as a corresponding two dimensional data representation.

Application of the transpose function identifies rows of the input data (912). These identified rows of input data are read (914) and one or more output columns per cycle is generated (918). It is also an embodiment of this disclosure that higher throughput would result in more outputs column per cycle. Indeed, the level of throughput determines the output columns per cycle.

The transpose function, for example an IM2COL function identifies redundant elements based on the transpose of the input data (920). The redundant elements location (924) and quantity (926) are part of this identification.

The redundant elements of identified by the transpose are reduced (930). A determination is made whether there are additional data elements (932). If so (934), the transpose is applied to the additional input data elements. If not (936), a resultant array is generated (940). The algorithm ends (942).

Figure 10:
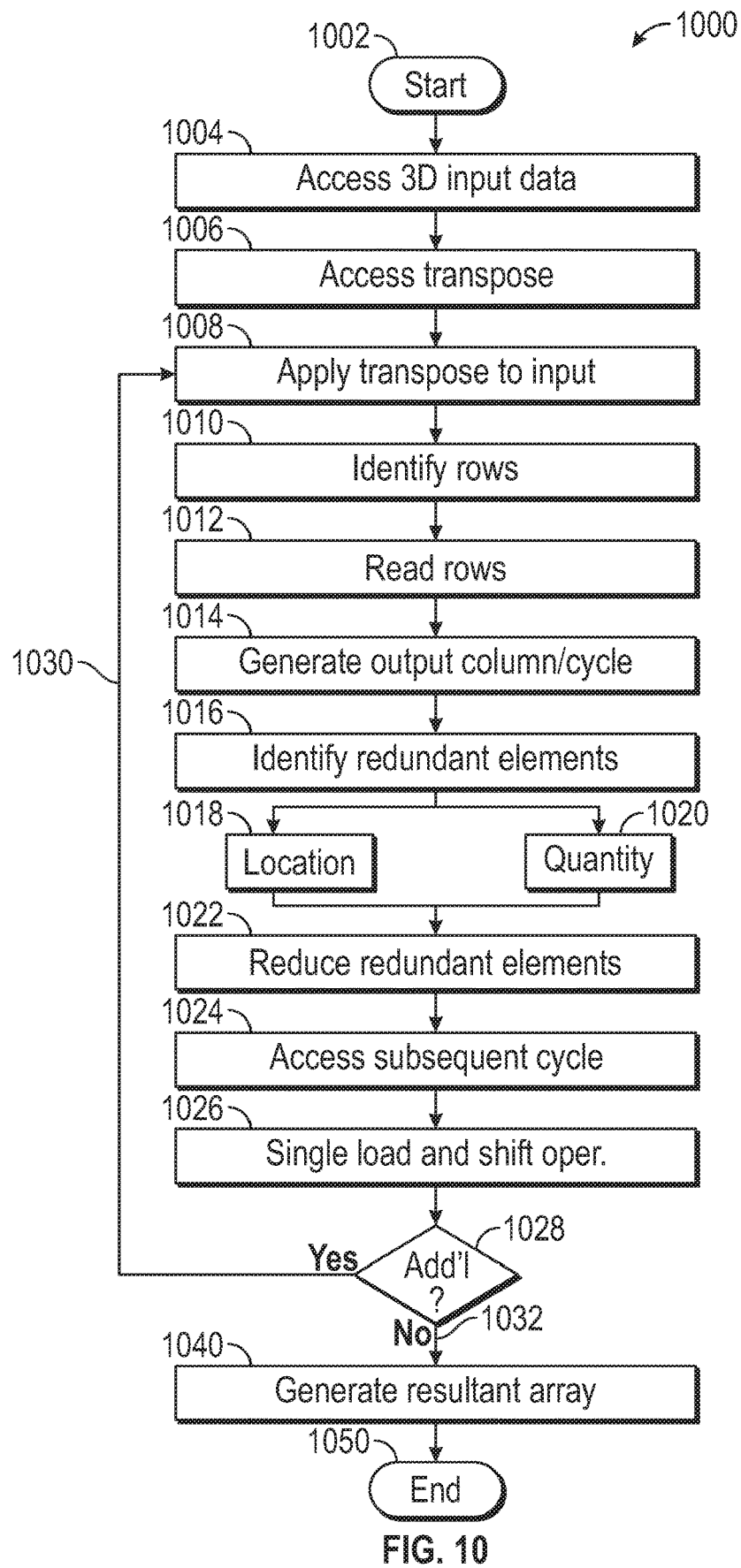
FIG. 10 illustrates a flowchart according to an embodiment.

FIG. 10 shows a flowchart 1000 according to an embodiment. The algorithm 1000 begins (1002). A three-dimensional input data representation is accessed (1004). This three-dimensional data representation may be image, audio, a combination of image and audio or any type of data that may be stored. The input may be an input feature map, as described herein.

A transpose function, such as an IM2COL function is accessed (1006). This transpose function, for example the IM2COL function, is applied to the three-dimensional data (1008) and is used to "flatten" the three-dimensional input data representation so that the three-dimensional input data representation can be represented as a corresponding two dimensional data representation.

Application of the transpose function identifies rows of the input data (1010). These identified rows of input data are read (1012) and one or more output columns per cycle are generated (1014). It is also an embodiment of this disclosure that higher throughput would result in more outputs column per cycle. Indeed, the level of throughput determines the output columns per cycle.

The transpose function, for example an IM2COL function identifies redundant elements based on the transpose of the input data (1016). The redundant elements location (1018) and quantity (1020) are part of this identification.

The redundant elements of identified by the transpose are reduced (1022). A subsequent cycle is accessed (1024) and a single load and shift operation is performed (1026).

A determination is made whether there are additional data elements (1028). If so (1030), the transpose is applied to the additional input data elements. If not (1032), a resultant array is generated (1040). The algorithm ends (1050).

The series of operations 900 (FIG. 9) and 1000 (FIG. 10) may be stored on non-volatile memory or other suitable memory or computer-usable medium and in any suitable programming language.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if desired, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wire line, optical fiber cable, RF, etc.

Computer program code for carrying out operations of the present disclosure may be written in any combination of one or more programming languages, including an object-oriented programming language such as Java, Smalltalk, C++, C # or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus, systems and computer program products according to embodiments. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer, or other programmable data processing apparatus, create means for implementing the functions/acts specified in the flowchart and/or block diagram block or blocks. These computer program instructions may also be stored in a computer-readable medium that can direct a computer or other programmable data processing apparatus, to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operations to be performed on the computer, or other programmable apparatus to produce a computer-implemented process such that the instructions which execute on the computer or other programmable apparatus, provide processes for implementing the functions/acts specified in the flowchart and/or block diagram block or blocks.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if desired, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wire line, optical fiber cable, RF, etc.

The present embodiments are described below with reference to flowchart illustrations and/or block diagrams of methods, apparatus, systems and computer program products according to embodiments. It will be understood that each block of the flowchart illustrations and/or block diagrams, and combinations of blocks in the flowchart illustrations and/or block diagrams, can be implemented by computer program instructions.

Unless stated otherwise, terms such as "first" and "second" are used to arbitrarily distinguish between the elements such terms describe. Thus, these terms are not necessarily intended to indicate temporal or other prioritization of such elements.

As will be appreciated by one skilled in the art, the disclosure may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiments may take the form of a computer program product embodied in any tangible medium of expression having computer-usable program code embodied in the medium.

It can be seen that the system and methodologies presented herein provide an advancement in the state of the art.

Accordingly, some of the disclosed embodiments are set out in the following items:

1. A method comprising: accessing a three-dimensional representation of input data; accessing a transpose function; applying the transpose function to the input data; identifying one or more rows of the input data; generating one or more columns for each cycle of input data; identifying redundant characteristics of the input data based on each column generated; reducing the redundant characteristics for each column; performing a load and shift operation on a subsequent cycle of the input data; and producing a resultant array based on the reduced columns.

2. The method as itemed in item 1, further comprising performing an identical operation on a plurality of input data points of the input data substantially simultaneously.

3. The method as itemed in item 1, where the transpose function is an image-to-column transpose function.

4. The method as itemed in item 1, further comprising performing a plurality of multiply-and-accumulate operations on the input data.

5. The method as itemed in item 1, where memory blocks of the resultant array are aligned.

6. The method as itemed in item 1, further comprising reading a four-element row of the input data to generate a four-element column in the resultant array.

7. The method as itemed in item 1, where the resultant array is a two-dimensional array.

8. A method comprising: accessing a three-dimensional representation of input data; accessing a transpose function; applying the transpose function to the input data; identifying one or more rows of the input data; generating one or more columns for each cycle of input data; identifying redundant characteristics of the input data based on each column generated; reducing the redundant characteristics for each column; and producing a resultant array based on the reduced columns.

9. The method as itemed in item 8, where each subsequent cycle utilizes a maximum of two new operands per cycle.

10. The method as itemed in item 8, further comprising performing an identical operation on a plurality of input data points of the input data substantially simultaneously.

11. The method as itemed in item 8, where memory blocks of the resultant array are staggered.

12. The method as itemed in item 8, where the resultant array is a two-dimensional array.

13. The method as itemed in item 8, where the function is an image-to-column transpose function.

14. An apparatus comprising: an input module adapted to store a three-dimensional input data representation; a transpose module adapted to store a transpose function, where:

the transpose function is applied to the three-dimensional input data representation; the transpose function identifies one or more rows of the input data; the transpose function generates one or more columns for each cycle of input data; the transpose function identifies redundant characteristics of the input data based on each single column generated; the transpose function reduces the redundant characteristics for each column; and the transpose function produces a resultant array based on the reduced columns.

15. The apparatus as itemed in item 14, where the transpose function is an image-to-column transpose function.

16. The apparatus as itemed in item 14, where the resultant array is a two-dimensional array.

17. The apparatus as itemed in item 14 where memory blocks of the resultant array are aligned.

18. The apparatus as itemed in item 14 where memory blocks of the resultant array are staggered.

19. The apparatus as itemed in item 14 where the transpose function performs an identical operation on a plurality of input data points of the input data substantially simultaneously.

20. A system comprising: a memory; and a processor, coupled to the memory, adapted to execute instructions stored in the memory, the instructions comprising: access a three-dimensional representation of input data; access a transpose function; apply the transpose function to the input data; identify one or more rows of the input data; generate one or more columns for each cycle of input data; identify redundant characteristics of the input data based on each column generated; reduce the redundant characteristics for each column; and produce a resultant array based on the reduced columns.

21. The system as itemed in item 20, where the instructions further comprise perform a load and shift operation on a subsequent cycle of the input data.

22. The system as itemed in item 20, where the transpose function is an image-to-column transpose function.

23. The system as itemed in item 20, where memory blocks of the resultant array are aligned.

24. The system as itemed in item 20, where memory blocks of the resultant array are staggered.

25. The system as itemed in item 20, where the resultant array is a two-dimensional array.

26. The system as itemed in item 20 where the instructions further comprise perform an identical operation on a plurality of input data points of the input data substantially simultaneously.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

The invention claimed is:

1. A method comprising:
accessing, from a memory register, a three-dimensional representation of input data;
accessing, from a transpose memory, a transpose function;
applying, utilizing a processor, the transpose function to the three-dimensional representation of input data during a processing cycle;
identifying one or more rows of the input data during the processing cycle;
generating one or more output columns associated with each transpose function processing cycle of the input data;
identifying one or more redundant characteristics of the input data based on each output column generated;
reducing one or more redundant characteristics for each output column, to produce an associated reduced output column for each output column;
performing a load and shift operation on a subsequent transpose function processing cycle of the input data;
producing a resultant array based on the reduced output columns, and based upon reduced processing; and
storing the resultant array in an electronic memory.

2. The method as claimed in claim 1, further comprising applying the transpose function to a plurality of input data points of the input data.

3. The method as claimed in claim 1, where the transpose function is an image-to-column transpose function.

4. The method as claimed in claim 1, further comprising performing a plurality of multiply-and-accumulate operations on the input data.

5. The method as claimed in claim 1, where the resultant array has aligned memory blocks.

6. The method as claimed in claim 1, further comprising reading a four-element row of the input data to generate a four-element column in the resultant array.

7. The method as claimed in claim 1, where the resultant array is a two-dimensional array.

8. A method comprising:
accessing, from a memory, a three-dimensional representation of input data;
accessing, from a transpose memory, a transpose function;
applying, utilizing a processor, the transpose function to the three dimensional representation of input data during a processing cycle;
identifying one or more rows of the input data during the processing cycle;
generating one or more output columns associated with each transpose function processing cycle of the input data;
identifying one or more redundant characteristics of the input data based on each output column generated;
reducing one or more redundant characteristics for each output column, to produce an associated reduced output column for each output column;
producing a resultant array based on the reduced output columns, and based upon reduced processing; and
storing the resultant array in an electronic memory.

9. The method as claimed in claim 8, where each subsequent transpose function processing cycle utilizes a maximum of two new operands per cycle.

10. The method as claimed in claim 8, further comprising applying the transpose function to a plurality of input data points of the input data.

11. The method as claimed in claim 8, where the resultant array has staggered memory blocks.

12. The method as claimed in claim 8, where the resultant array is a two-dimensional array.

13. The method as claimed in claim 8, where the transpose function is an image-to-column transpose function.

14. An apparatus comprising:
a memory register adapted to store a three-dimensional input data representation;
a transpose memory adapted to store a transpose function, where:
the transpose function is applied to the three-dimensional input data representation;

the transpose function identifies one or more rows of the three-dimensional input data representation;

the transpose function generates one or more output columns of data associated with each cycle of the three-dimensional input data representation during a processing cycle;

the transpose function identifies redundant characteristics of the three-dimensional input data representation based on each of the one or more output columns of data generated during the processing cycle;

the transpose function reduces the redundant characteristics for each output column, to produce an associated reduced output column for each output column; and the transpose function produces a resultant array based on the reduced output columns and based upon reduced processing; and the transpose function stores the resultant array in an electronic memory.

15. The apparatus as claimed in claim 14, where the transpose function is an image-to-column transpose function.

16. The apparatus as claimed in claim 14, where the resultant array is a two-dimensional array.

17. The apparatus as claimed in claim 14 where the resultant array has aligned memory blocks.

18. The apparatus as claimed in claim 14 where the resultant array has staggered memory blocks.

19. The apparatus as claimed in claim 14 where the transpose function is repeated on a plurality of input data points of the three-dimensional input data representation.

20. A system comprising:
a memory; and
a processor, coupled to the memory, adapted to execute instructions stored in the memory, the instructions comprising:
access a three-dimensional representation of input data;
access a transpose function;
apply the transpose function to the three-dimensional representation of input data;
identify one or more rows of the input data;
generate one or more output columns for each transpose function application cycle of the three-dimensional representation of input data;
identify redundant characteristics of the input data based on each output column generated;
reduce the redundant characteristics for each output column, to produce an associated reduced output column for each column;
produce a resultant array based on the reduced output columns and based upon reduced processing; and
store the resultant array in an electronic memory.

21. The system as claimed in claim 20, where the instructions further comprise perform a load and shift operation on a subsequent transpose function cycle of the input data.

22. The system as claimed in claim 20, where the transpose function is an image-to-column transpose function.

23. The system as claimed in claim 20, where the resultant array has staggered memory blocks.

24. The system as claimed in claim 20, where the resultant array has staggered memory blocks.

25. The system as claimed in claim 20, where the resultant array is a two-dimensional array.

26. The system as claimed in claim 20 where the instructions further comprise repeating applying the transpose function on a plurality of input data points of the input data.

* * * * *